Aug. 7, 1934.  A. W. MONTGOMERY ET AL  1,969,573
ELECTRICAL MEASURING SYSTEM
Filed June 3, 1932

INVENTORS: A.W.MONTGOMERY
V.J.TERRY
BY J. W. Schmied
ATTORNEY

Patented Aug. 7, 1934

1,969,573

UNITED STATES PATENT OFFICE 1,969,573

ELECTRICAL MEASURING SYSTEM

Alexander William Montgomery and Victor John Terry, Aldwych, London, England, assignors to Western Electric Company, Incorporated, New York, N. Y., a corporation of New York Application June 3, 1932, Serial No. 615,158
In Great Britain October 9, 1931

7 Claims. (Cl. 178—69)

This invention relates to electrical measuring systems and more particularly to a method of and apparatus for the direct measurement of the distortion of telegraph signals.

In apparatus of the type to which this invention relates it is usual to make each signal (change of current) produce a flash of light whose position on a graduated scale is an indication of the instant at which it occurs. When undistorted, the signals measured are separated by intervals which are integral multiples of time units, and the time scale is repeated after an integral number of time units so that the flashes of light are visible only at definite points upon the scale. Any deviation of the flashes from these points on the scale is an indication of distortion, and the range of such deviation is a direct measure of the degree of distortion.

An object of the present invention is to employ a cathode ray tube in a more efficient or convenient way than heretofore for the direct measurement of telegraphic distortion.

According to one feature of the invention a device for indicating or measuring the distortion of telegraph signals or the like comprises means for converting signals of both polarities into substantially unidirectional impulses of one polarity, and means for impressing the latter on the input of a cathode ray tube.

As used in the present specification, the term "signal" denotes a change of the signaling current, not a mark or a space. In accordance with this definition, signals of both polarities occur both in single current signals (current flowing in one direction only) and in double current signals (neutral or polar operation, current flowing in both directions).

According to another feature of the invention a device for indicating or measuring the distortion of telegraph signals or the like comprises a cathode ray tube wherein signal controlled means govern the intensity of the ionic beam and wherein means are provided for deflecting the ionic beam over an indicating surface at a rate proportional to the speed of the signals.

Figure 1:
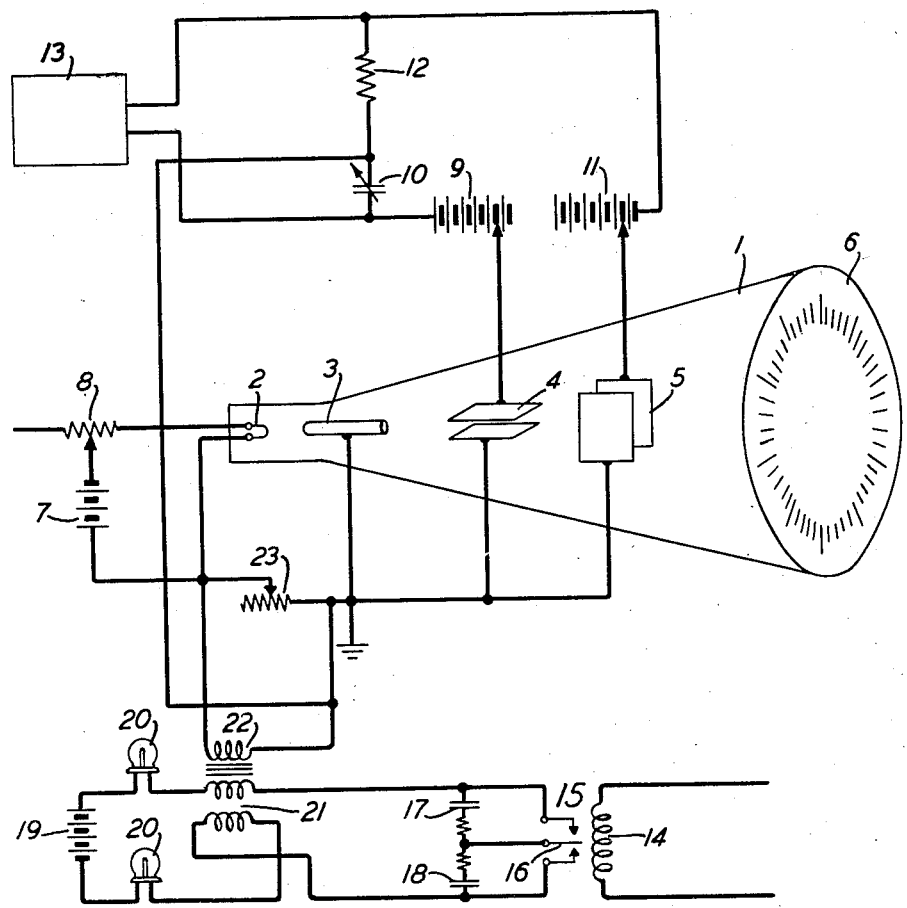
Figure 2:
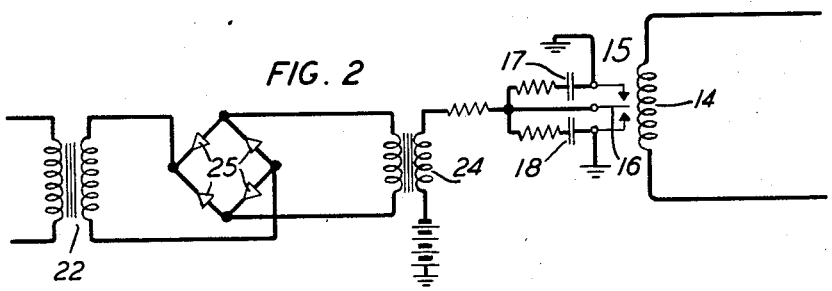

Other features of the invention will be disclosed in the following description having reference to the accompanying drawing in which identical reference characters indicate similar parts and of which Fig. 1 illustrates a circuit arrangement of apparatus according to the present invention; and Fig. 2 illustrates a modification of a detail of Fig. 1.

In the first figure, 1 indicates a cathode ray tube having a cathode 2, an anode 3, two pairs of deflecting plates 4 and 5 and a polar scale 6 of luminescent material upon which a cathodic beam may be caused to impinge with a rotary motion. The filament 2 is energized by a heating battery 7, through a rheostat 8. The cathode beam is under the influence of a rotating electrostatic field obtained by means of the plates 4 and 5 to which potentials are fed differing in phase by 90° but having the same magnitude and frequency. The potential on the plates 4 is derived from a battery 9 over a condenser 10 whereas the potential on the plates 5 is derived from the battery 11 over a resistance 12. On the potentials thus imposed on these plates there are superimposed potentials from the oscillator 13 whose frequency is approximately equal to that of the signals. The frequency of the oscillator 13 must be the same as that of the dot frequency of the signals which are to be measured for distortion. If there were a continuous cathodic beam, the rotating field produced by the plates 4 and 5 would cause a spot of light to move continuously round the polar scale 6 at a speed proportional to the signaling speed.

The signals to be measured are derived from a circuit 14 which is caused to operate a measuring relay 15. This relay has a contact arm 16 connected to a point symmetrical between condensers 17 and 18 each of which, according to the position of the contact arm 16, is adapted to be charged from a battery 19 or discharged. Protective lamps 20 are preferably provided in this circuit which also includes an induction coil 21. This induction coil is adapted to induce a voltage in the coil 22 so that a potential drop occurs against a damping resistance 23.

The operation of the device is as follows:

Normally the potential on the anode 3 is insufficient to cause a cathodic beam to impinge on the scale 6; alternately the potential may be so arranged that although the cathodic beam does impinge on the scale 6 the spot of light is only on the threshold of visibility. When an E. M. F. is induced in the coil 22, the potential of the anode 3 is raised so that the cathode beam reaches the scale 6 to produce a spot of light which is clearly visible.

When a signal arrives in the circuit 14, and the arm 16 is moved to the bottom contact from the top contact, condenser 18 discharges and condenser 17 takes charging current from the battery 19. Thus, a current is set up in the upper winding of coil 21, inducing the necessary potential in coil 22 to cause the operation of the cathode tube. The windings of coil 21 are connected in series-aiding. On the next change in direction of current in the circuit 14 the arm 16 moves to the top contact and condenser 18 takes charging current, energizes both coils 21 and induces an impulse in the circuit including winding 22. Thus, for each change of current a momentary cathodic beam is discharged on to the scale 6. The damping resistance 23 shortens the effect of each impulse derived from the coils 21. For messages in unrestricted codes the most convenient period for the repetition of the time scale is one time unit, for then all signals in an undistorted train occur in the same place on the time scale. For messages in which the separation between signals is restricted to odd numbers of time units (Morse code), it is sometimes advantageous to use a scale repeating after two time units, whereby positive and negative signals are separated and should occur on the scale one time unit apart.

It has been found possible to dispense with absolute synchronism between the telegraph transmitter and the rotating field so long as the latter is stable and driven at the same speed. In practice, the speeds should preferably be within one part in ten thousand but this equality is only required for very short periods. Sufficient synchronism may also be attained by using a tuning fork driven distributor and a vacuum tube oscillator: or by the use of an ordinary Creed type Morse transmitter and an oscillator.

A modified method of obtaining unidirectional pulses is shown in Fig. 2. Like reference characters indicate similar parts in Figs. 1 and 2. In the modification, the current flowing in the primary winding of transformer 24 is momentarily interrupted during the time that the armature 16 of relay 15 is changing from one contact to the other. This occurs between signals when the current in the winding 14 reverses. This interruption of current in the primary winding of transformer 24 induces impulses of opposite polarity in the secondary winding of transformer 24 which are rectified to produce a single unidirectional pulse through the primary of coil 22 by the rectifier elements 25. This rectified impulse produces an impulse in the anode circuit of tube 1 through the action of induction coil 22. This causes a spot to appear on the scale 6 as described in the description of Fig. 1.

The invention has been described with reference to a particular embodiment and it is to be understood that various modifications may be made without departing from the scope of the invention.

What is claimed is:

1. Apparatus for indicating or measuring the distortion of telegraph signals which comprises a cathode ray tube, instrumentalities for converting signals of both polarities into substantially unidirectional impulses of one polarity, instrumentalities for impressing said impulses on the input of said cathode ray tube, and graduated means associated with said tube for enabling the direct visual observation of said impulses.

2. Apparatus for indicating or measuring the distortion in telegraph signals, comprising a device for converting telegraph signals of both polarities into substantially unidirectional impulses of one polarity, a cathode ray tube, circuit instrumentalities for causing said unidirectional impulses to control the intensity of the ionic beam of said tube, and means for deflecting the ionic beam over an indicating surface at a rate proportional to the speed of the signals.

3. In an apparatus for measuring or indicating the distortion of polarized telegraph signals, a cathode ray tube, an induction coil connected thereto, and circuit means coupled to the source of signals to be measured and to said induction coil for producing in said induction coil unidirectional impulses when said signals change polarities.

4. An apparatus for measuring or indicating the distortion in telegraph signals, comprising a cathode ray tube connected through an induction coil to a device for transforming impulses of current having alternately different directions into substantially unidirectional impulses, instrumentalities for causing said unidirectional impulses to control the intensity of an ionic beam of said tube, and a transformer connecting said device and a receiving relay, said relay being actuated by the signals whose distortion is to be measured.

5. An apparatus according to claim 4 characterized in that the circuit including the induction coil and the input of the cathode ray tube circuit comprises a damping resistance.

6. Apparatus as defined in claim 1 characterized in that the signal converting instrumentalities include rectifying means.

7. In a circuit for indicating distortion of impulses, a circuit over which impulses to be indicated arrive, a device for causing a shorter impulse at a significant point in the arriving impulses such as the beginning or ending thereof, a cathode ray tube, means for actuating the beam of the tube by the shorter impulses and a device for distributing successive indications of said beam resulting from separate short impulses over the field of said tube.

ALEXANDER WILLIAM MONTGOMERY.
VICTOR JOHN TERRY.